United States Patent
Wang

(10) Patent No.: US 7,212,738 B1
(45) Date of Patent: May 1, 2007

(54) PREVENTING SIGNAL LOSS IN AN OPTICAL COMMUNICATIONS NETWORK

(75) Inventor: Steve Wang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 698 days.

(21) Appl. No.: 10/422,926

(22) Filed: Apr. 23, 2003

Related U.S. Application Data

(60) Provisional application No. 60/418,445, filed on Oct. 15, 2002, provisional application No. 60/400,303, filed on Aug. 1, 2002.

(51) Int. Cl.
G02F 1/00 (2006.01)
G02F 2/00 (2006.01)
H01S 3/00 (2006.01)
H04B 10/00 (2006.01)
H04J 14/00 (2006.01)

(52) U.S. Cl. ............... 398/2; 398/5; 398/17; 398/170

(58) Field of Classification Search ............... 398/170, 398/151, 155, 2, 5
See application file for complete search history.

(56) References Cited

U.S. PATENT DOCUMENTS

| | | | |
|---|---|---|---|
| 4,753,505 A | 6/1988 | Mikami et al. | |
| 5,321,774 A * | 6/1994 | Barnard et al. | 385/16 |
| 5,680,235 A * | 10/1997 | Johansson | 398/7 |
| 5,777,761 A * | 7/1998 | Fee | 398/7 |
| 5,872,904 A | 2/1999 | McMillen et al. | |
| 6,002,823 A | 12/1999 | Chandross et al. | |
| 6,256,436 B1 * | 7/2001 | Nakama | 385/37 |
| 6,324,318 B1 * | 11/2001 | Suzuki | 385/24 |
| 6,404,525 B1 * | 6/2002 | Shimomura et al. | 398/82 |
| 6,567,579 B2 | 5/2003 | Foltzner | |
| 6,868,198 B2 * | 3/2005 | Sunaga et al. | 385/18 |

FOREIGN PATENT DOCUMENTS

| | | |
|---|---|---|
| EP | 0 367 682 | 5/1990 |
| WO | WO 97/22907 | 6/1997 |

OTHER PUBLICATIONS

Thylen, L., "Integrated Optics in LiNbO$_3$: Recent Developments in Devices for Telecommunications" pp. 2,6,7, 21,22, 24-27, vol. 6, No. 6, Jun. 1, 1988.
Sakuma, Ken; Ogawa, Hirokuni; Fujita, Daigo; Hosoya, Hideyuki, "Polymer Y-Branching Thermo-Optics Switch For Optical Fiber Communications Systems" Optical Communications Technology Department, Oct. 24, 2001.

\* cited by examiner

*Primary Examiner*—Kenneth Vanderpuye
*Assistant Examiner*—Luis Garcia
(74) *Attorney, Agent, or Firm*—Workman Nydegger

(57) ABSTRACT

A redundant optical signal transmission and reception system enables information exchange via an optical communications network without data loss in the event of optical transmitter or receiver failure. In one embodiment, the redundant optical signal system includes a primary transmission link comprising a plurality of optical transmitters and a multiplexor for modulating and combining electrical signals into a primary multiplexed optical signal. In the event of failure of an optical transmitter, a backup transmission link is activated to compensate for the malfunctioning transmitter. The backup transmission link utilizes a backup optical transmitter to modulate the electric signal formerly received by the malfunctioning optical transmitter. The backup transmission link combines the backup optical signal with the primary multiplexed optical signal to form a complete optical signal for transmission over the optical network. In another embodiment, a similar process is performed for providing backup optical signal reception.

40 Claims, 5 Drawing Sheets

PREVENTING SIGNAL LOSS IN AN OPTICAL COMMUNICATIONS NETWORK

RELATED APPLICATIONS

This application claims the benefit of U.S. Provisional Patent Application Ser. No. 60/400,303, filed Aug. 1, 2002, and of U.S. Provisional Patent Application Ser. No. 60/418,445, filed Oct. 15, 2002, which are incorporated herein by reference.

BACKGROUND OF THE INVENTION

1. The Field of the Invention

The present invention generally relates to optical communications networks. In particular, the present invention relates to systems and methods that provide redundant production and reception of channels in a multiplexed optical signal.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks often employ a technique called wavelength division multiplexing (WDM) in order to maximize the amount of information that can be transmitted via the network. A plurality of optical transmitters are used at the transmission node of the optical network to transmit optical signals. Each optical transmitter receives an electric signal from a network device, such as a computer, and modulates the electric signal via a laser to an optical signal having a distinct wavelength, called a channel. The distinct channels from the plurality of optical transmitters are then combined by a multiplexor to form a multiplexed optical signal. The multiplexed WDM optical signal can then be transmitted via a single fiber optic cable to the optical network, such as a LAN backbone. The multiplexed optical signal is then received by a reception node of the network.

Once received by the reception node, the multiplexed optical signal is divided back into its constituent channels by a demultiplexor, and each channel is fed to one of a plurality of optical receivers for modulation into electrical signals. The electrical signals are then forwarded to a network device, such as a computer, for processing.

Though highly useful as a means for transmitting information, optical communications networks can occasionally suffer from certain device failures. For example, occasional failures can occur with either an optical transmitter in the transmitter bank, or an optical receiver in the receiver bank. When an optical transmitter fails, it fails to modulate the corresponding electrical signal into an optical signal channel, causing a void in the multiplexed optical signal. This can result in an undesirable loss of a significant amount of important data. Correspondingly, in the case of an optical receiver failure, the channel of the optical signal corresponding to the failed receiver is not converted into an electric signal, also resulting in an information void and unintended data loss. As may be appreciated, such transmitter or receiver failures can severely inhibit the effectiveness and operation of the optical communications network.

Known attempts for dealing with such transmitter failures have typically involved creating a full redundant set of backup optical transmitters, so that each channel has a primary transmitter and also has a backup transmitter which is used in the event of failure of the corresponding primary transmitter. Failure of optical receivers can also be managed using a similar full redundant set of backup optical receivers. Even though the use of a full redundant set of backup transmitters or receivers can reliably protect against the failure of a primary transmitter or receiver, the redundant system described above can be expensive to implement in an optical communications network. For instance, the use of redundant sets of backup optical transmitters or receivers doubles the number of transmitters or receivers in a transmission or reception node, since each channel has a primary and a backup component. This can dramatically increase the cost of optical networks so configured. Additionally, the full redundant sets of transmitters and receivers undesirably increase the complexity of the optical network.

A need therefore exists for a redundant optical communications network that can compensate for occasional optical transmitter or receiver failure by providing backup optical transmission and reception while avoiding the problems described above. Specifically, there is a need for an optical communications network having redundant transmission and reception capability that can be implemented in a simple and low-cost configuration.

BRIEF SUMMARY OF THE INVENTION

The present invention is directed to an optical communications system having redundant transmission and receiving capability. According to a first aspect of the invention, optical transmission redundancy is provided via a backup signal transmission link that operates in conjunction with a primary transmission link to provide an uninterrupted, multiplexed optical signal to a communications network. According to a second aspect of the invention, optical reception redundancy of a demultiplexed optical signal is similarly implemented via a backup signal reception link operating in conjunction with the primary reception link. Either the transmission redundancy, the reception redundancy, or both, can be implemented at a transmission node and a reception node of the optical communications network, respectively.

According to the first aspect of the invention, a primary optical signal transmission link is provided, generally including a transmitter bank, a switch array, and a multiplexor. The transmitter bank includes a plurality of primary optical transmitters for producing a plurality of wavelength-distinct optical signal channels. The transmitter bank is in communication with a multiplexor that combines the wavelength-distinct channels produced by the transmitters into a multiplexed optical signal. The multiplexed optical signal is produced when the various channels are directed at specified angles of incidence to a diffraction grating that combines, or multiplexes, the channels into a unitary signal, which is then output in a first direction from the multiplexor. The switch array is disposed between the transmitter bank and the multiplexor, and includes an optical switch for each optical transmitter. Each switch is configured to either allow an optical signal to pass, or to be reflected, if needed, in conjunction with operation of the backup signal transmission link below.

In the event of failure of one of the primary transmitters in the transmitter bank, activation of a backup signal transmission link is initiated. The backup signal transmission link generally includes a tunable backup optical transmitter that is tuned to modulate electrical signals from a connected device at the same wavelength as the failed optical transmitter. This modulation creates a backup optical signal channel that compensates for the channel formerly produced by the malfunctioning primary optical transmitter. The backup channel is redirected via an optical circulator from the backup transmitter to the multiplexor, where it is directed to the diffraction grating in a direction opposite the first direction traveled by the multiplexed optical signal. The backup channel is diffracted by the diffraction grating at such an angle as to be directed toward the optical switch in the switch array corresponding to the malfunctioning optical transmitter. The corresponding optical switch is placed in a reflective state so as to reflect the incoming backup channel back toward the diffraction grating. The incidence and reflection of the backup channel on the switch is such that the backup channel travels back to the diffraction grating along the same path that would be taken by the channel otherwise produced by the malfunctioning primary optical transmitter. The backup channel then diffracts off the grating at an angle of diffraction that enables it to combine with the incomplete multiplexed optical signal, which is simultaneously diffracting off of the grating, to form a complete optical signal. The complete optical signal is then directed back through the optical circulator and transmitted to the optical network.

Redundancy in the primary reception link of an optical communications network is similarly provided in a second embodiment of the present invention. A backup signal reception link is provided in this embodiment to work in conjunction with a primary signal reception link. The primary signal reception link generally includes a demultiplexor that receives an incoming multiplexed optical signal traveling in a first direction and separates it into its constituent wavelength-specific channels via a diffraction grating. Each of the channels is distributed by the demultiplexor to one of a plurality of primary optical receivers disposed in a receiver bank. A switch array comprising a plurality of switches that each correspond to one of the plurality of primary optical receivers is disposed between the demultiplexor and the receiver bank. Each switch can either allow the respective incoming channel to pass to its corresponding primary receiver or, if needed, can reflect the channel for use by the backup signal reception link.

In the event of the failure of one of the primary optical receivers in the receiver bank, activation of the backup signal reception link is initiated. Upon malfunction of a specified primary optical receiver, the corresponding switch is changed from an open state to a reflective state to reflect the specified incoming channel traveling from the demultiplexor. The specified channel is reflected by the switch so as travel back to the diffraction grating of the demultiplexor with a path identical to its incoming path. The specified channel then diffracts off the grating and exits the demultiplexor in a second direction that is opposite the first direction of the incoming multiplexed optical signal. The specified channel is redirected via an optical circulator to a backup optical receiver that receives and modulates the specified optical channel into an electrical channel for use by a connected device. The remaining channels are processed in normal fashion by the primary receivers in the receiver bank. Thus, the specified channel originally intended for the malfunctioning primary receiver is received and processed by the backup receiver, enabling all channels of the demultiplexed optical signal to be processed, even in the event of receiver failure or malfunction.

In this manner, the present invention enables redundancy to be implemented for optical transmission and reception operations performed in an optical communications network, while minimizing the number of components required to do so. The use of only a single redundant, tunable transmitter to compensate for the failure of any of the primary transmitter provide significant advantages compared to conventional systems. For instance, the use of only a single redundant transmitter eliminates the need for a full complement of backup transmitters, which greatly reduces the cost of the backup system, while providing reliable redundant transmission of optical signals. Similarly, the use of only a single redundant backup receiver significantly reduces the cost of implementing the backup reception system by eliminating the full complement of backup receivers.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1–5 depict various features of embodiments of the present invention, which is generally directed to an optical network communication system having redundant signal transmission and reception capability. The present system is implemented in such a way as to provide uninterrupted optical signal transmission and/or reception in the event of failure of an optical transmitter or receiver. The present system is able to provide this backup redundancy in a simplified manner, thereby reducing the cost as compared to known redundant systems.

Figure 1:
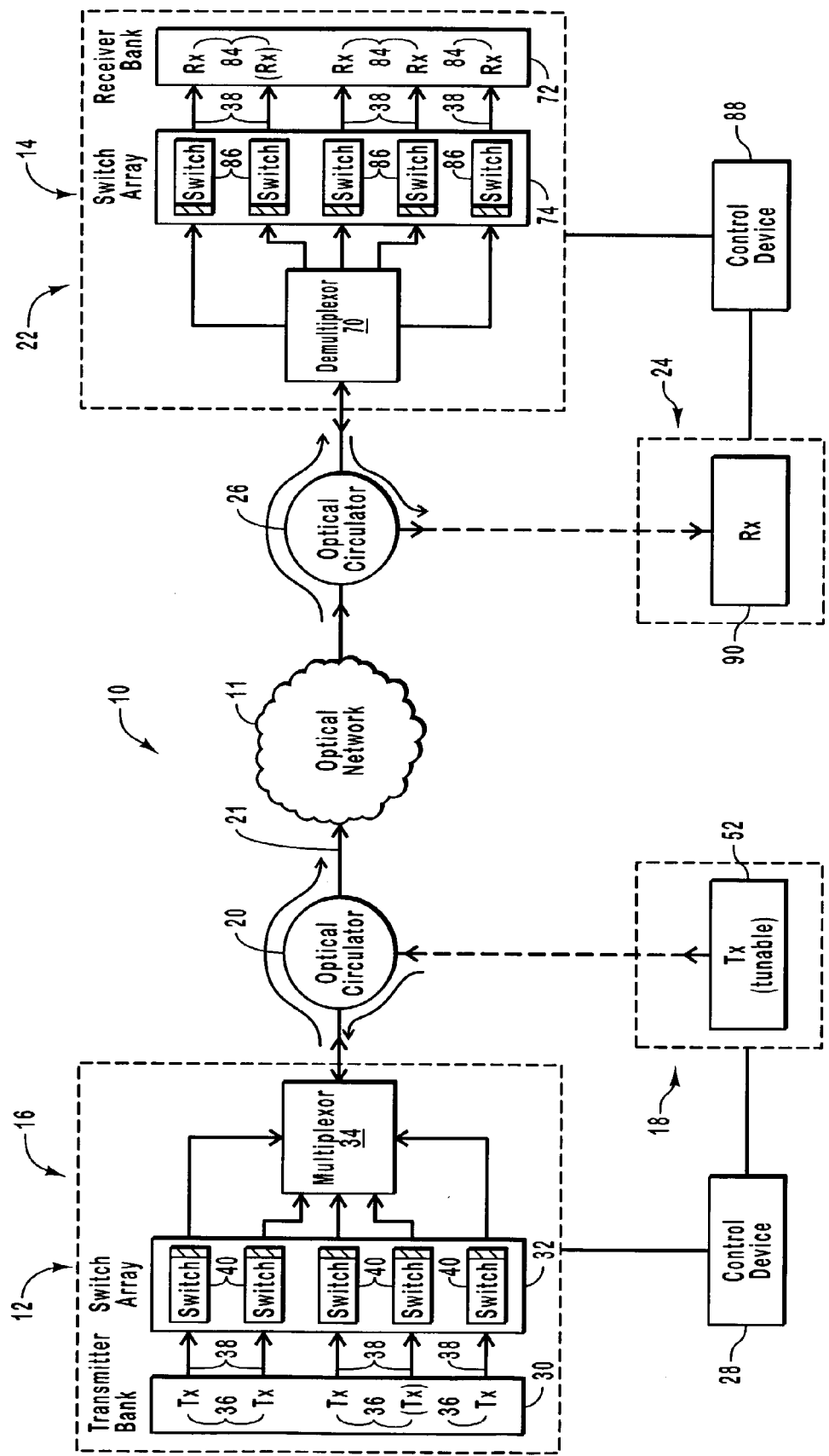
FIG. 1 is a block diagram showing various components comprising one embodiment of the present system for providing redundant optical transmission and reception.

Reference is first made to FIG. 1, which depicts various components comprising one presently preferred embodiment of a redundant optical signal transmission and reception system, generally designated at 10. The redundant system 10 is operably connected to an optical communications network 11, such as a local area network, for example.

The redundant system 10 generally comprises a transmission node 12 for transmitting optical signals via the network 11 and a reception node 14 for receiving optical signals. In the present embodiment, both nodes are incorporated into the redundant system 10; in other embodiments, the redundant system can comprise either the transmission node or the reception node. Additionally, in some embodiments the redundant system 10 can include a plurality of transmission and reception nodes.

As seen in FIG. 1, the transmission node 12 comprises a primary transmission link 16 and a backup transmission link 18. In the present embodiment, these two links are operably connected via an optical circulator 20. The optical circulator 20 also interconnects the primary transmission link 16 and the backup transmission link 18 to the rest of the optical network 11. This interconnection is provided via a communications medium 21 comprising, in presently preferred embodiments, fiber optic cable. Similarly, the reception node 14 comprises a primary reception link 22 and a backup reception link 24 interconnected to the network 11 as well as to each other via an optical circulator 26. The primary transmission link 16 and the backup transmission link 18 cooperate to provide redundant optical signal transmission for the network 11, while the primary reception link 22 and the backup reception link 24 cooperate for redundant optical signal reception, as explained in greater detail below.

Figure 2:
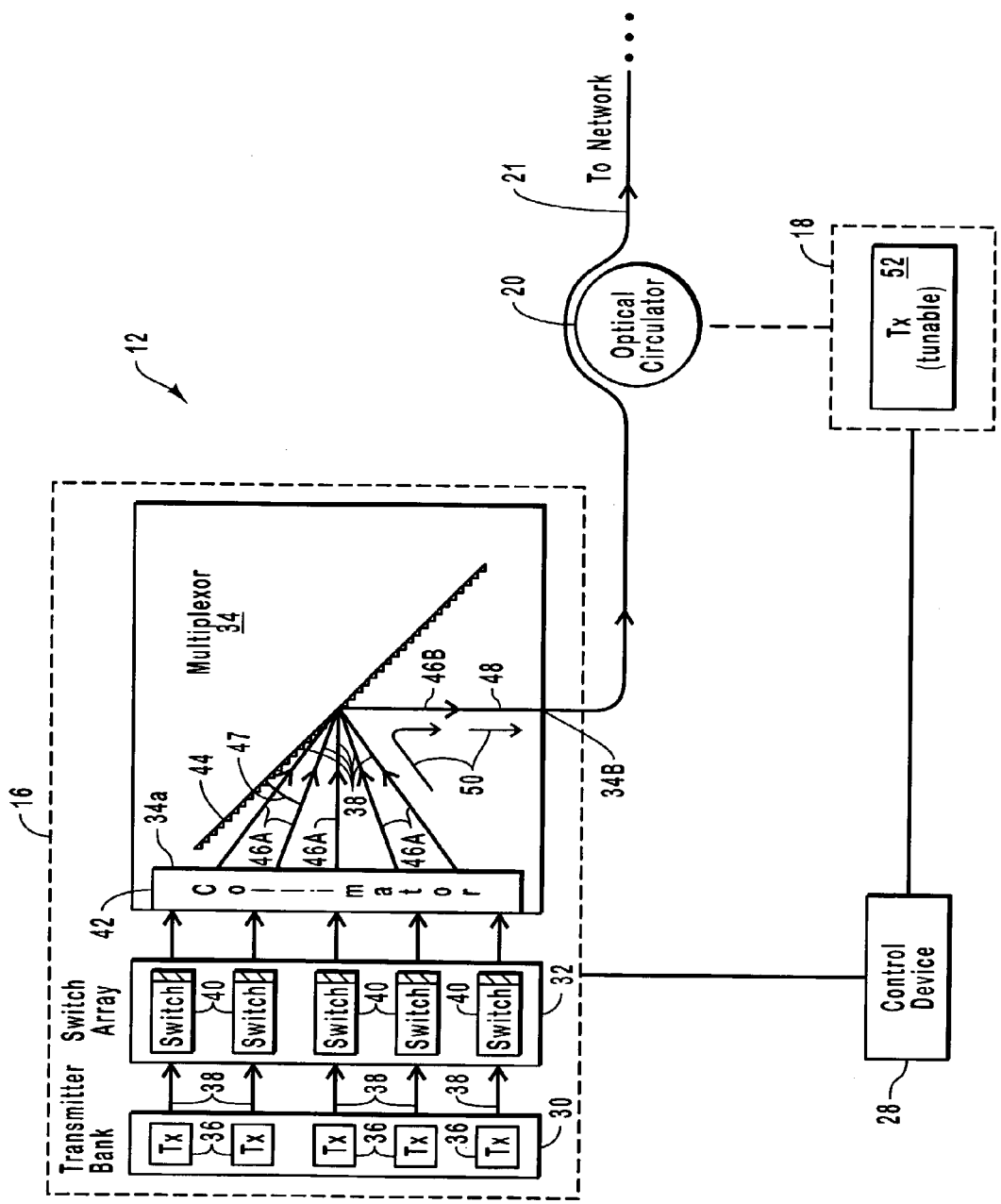
FIG. 2 is a block diagram showing the transmission node of FIG. 1 during normal operation.

Reference is now made to FIG. 2, which depicts further details of the transmission node 12 shown in FIG. 1. As already suggested, the transmission node 12 can operate in conjunction with a reception node 14 to establish the redundant system 10 of the present invention, or it may alternatively operate as a single node, representing the entire redundant system 10.

In greater detail, the transmission node 12 comprises the primary transmission link 16 and the backup transmission link 18 mentioned above, which are interconnected via the optical circulator 20. A control device 28 can be employed as part of the transmission node 12 to control operation of the various components of the node, including activation of the backup transmission link 18 and controlling the state of optical switches, mentioned below.

The primary transmission link 16 further comprises an optical transmitter bank 30, a switch array 32, and a multiplexor 34. The transmitter bank 30 includes a plurality of optical transmitters 36. Each optical transmitter 36 is configured to receive an electrical signal from an electronic component, such as a computer (not shown). The electrical signal is input into the respective optical transmitter 36, which modulates the electrical signal to an optical signal, as is known in the art. Each optical transmitter 36 is configured to produce an optical signal having a distinct wavelength. Each wavelength-distinct optical signal is referred to herein as a channel 38. In some embodiments, the optical transmitters 24 can alternatively comprise optical transceivers, integrating optical transmission and reception functions in a single component.

After modulation by the respective optical transmitter 36, each channel 38 is directed to the switch array 32. The switch array 32 comprises a plurality of optical switches 40, equal in number to the optical transmitters 36 disposed in the transmitter bank 30, such that each switch is matched to a corresponding transmitter 36. Each optical switch 40 acts as a gate by which optical signals comprising the channel 38 can either be transmitted through the switch or reflected by it according to its state. Accordingly, in an open state, the optical switch 40 allows the respective channel 38 to pass through the switch and proceed to the multiplexor 34. In its reflective state, corresponding to malfunction of the respective optical transmitter 36, the optical switch 40 is configured to reflect a backup optical signal produced by the backup transmission link 18 in order to provide backup channel production for the malfunctioning optical transmitter, as explained further below.

One example of the optical switch 40 can be found in U.S. Provisional Patent Application Ser. No. 60/418,445, filed Oct. 15, 2002, which is incorporated herein by reference. This application has also claimed the benefit of the filing date of U.S. Provisional Patent Application Ser. No. 60/418,445. In brief, the optical switch 40 made in accordance with the teachings of the above-named application includes a substrate having first and second optical signal waveguides disposed thereon. The second waveguide intersects with the first waveguide at a specified angle to define an intersection region. An electrode heater is disposed atop or adjacent to a portion of the intersection region. In the open state, optical signals are able to pass through the switch without deflection. In the reflective state, heating of the portion of the intersection region by the electrode heater causes the index of refraction to change in the heated portion of the intersection region with respect to the unheated portion. This creates a refractive index boundary within the intersection region, which enables an optical signal to be deflected from one of the waveguides to the other waveguide. A reflective component is disposed in a terminal end of the second waveguide to reflect any optical signals incident upon it during operation of the switch. Additionally, the optical switch may comprise other components not explicitly described here, including a collimator, relay switch, and a focusing device, that can be used to further condition or alter the channels that pass through the switch.

The optical switch 40 described above operates to direct the respective channel 38 according to the status of the corresponding optical transmitter 36. During normal operation, the switch 40 is in the open state, which allows the channel 38 produced by the transmitter 36 to enter the switch at a first end of the first waveguide, pass through the intersection region without deflection, and exit the switch at a second end of the first waveguide. The channel 38 then proceeds to the multiplexor 34, as will be explained in greater detail below.

When the corresponding optical transmitter 36 malfunctions, the optical switch 40 is changed to the reflective state. This enables a backup optical channel, which is discussed in greater detail below, to enter the switch at the second end of the first waveguide. The electrode heater is activated, thereby heating a portion of the intersection region. When the backup channel enters the intersection region, the refractive index boundary discussed above causes the backup channel to be deflected to the second waveguide. The backup channel proceeds along the second waveguide until impinging on the reflective component disposed at the terminal end of the second waveguide. The reflective component causes the backup channel to be reflected back in an opposite direction along the second waveguide. The backup channel then proceeds back along the second waveguide, through the intersection region where it is redirected again to the first waveguide, and finally exits the optical switch at the second end of the first waveguide. The backup channel is then utilized as explained further below. Further details concerning operation of the optical switch 40 in connection with the present invention are given hereinafter.

As suggested above, the channels 38 produced by the plurality of transmitters 36 are able to pass through the switches 40 to the multiplexor 34 when the switches are in the open state. Utilizing a process known as wavelength division multiplexing (WDM), the multiplexor 34 combines the various wavelength-distinct channels 38 produced by the respective optical transmitters 36 into a unitary multiplexed signal. Each wavelength-distinct channel 38 produced by the respective optical transmitter 36 is fed via the corresponding open switch 40 to a port 34A in the multiplexor 34. After entering the multiplexor 34, the plurality of channels 38 can be collimated by a collimator 42 such that each channel is directed toward a diffraction grating 44 or similar component in a specified first path 46A that converges with the paths of the other channels toward the grating. Alternatively, the collimator 42 can comprise a portion of the switch 40. The first path 46A of each channel 38 is assigned by the collimator 42 according to the wavelength of each channel. By virtue of their distinct wavelengths, each optical channel 38 is diffracted by the diffraction grating 44 at a distinct angle of diffraction. Thus, the first path 46A for each channel 38 is chosen by the collimator 42 such that the path forms a distinct angle of incidence, one of which is shown at 47 in FIG. 2, with the surface of the grating 44. This enables diffraction of the channels 38 by the grating 44 to be performed in such a way as to combine the channels into a single, multiplexed optical signal. This multiplexed signal is referred to herein as a primary optical signal 48.

As seen in FIG. 2, the primary optical signal 48 travels away from the diffraction grating 44 along a second path 46B and exits the multiplexor 34 at a port 34B. Passage of the channels 38 from port 34A to port 34B of the multiplexor 34 generally occurs in a first direction, denoted in FIG. 1 by arrows 50. The primary optical signal 48, comprising the plurality of channels 38, can then be sent via the communications medium 21 to other parts of the optical network 11. In the present embodiment, the primary optical signal 48 during normal operation passes through the optical circulator 20, which directs the signal to the network. The optical circulator 20, as well as the other optical circulators mentioned herein, operate by receiving an optical signal in one port thereof, and redirecting the signal in another direction through an adjacent port. In the present embodiment, this capability is used not only to direct the primary optical signal 48 to the network 11, but also to redirect a backup channel to the multiplexor 34. As will be seen, then, the optical circulator 20 serves as one example of a means for redirecting the backup channel to the multiplexor. Other means are also contemplated to perform this function.

Figure 3:
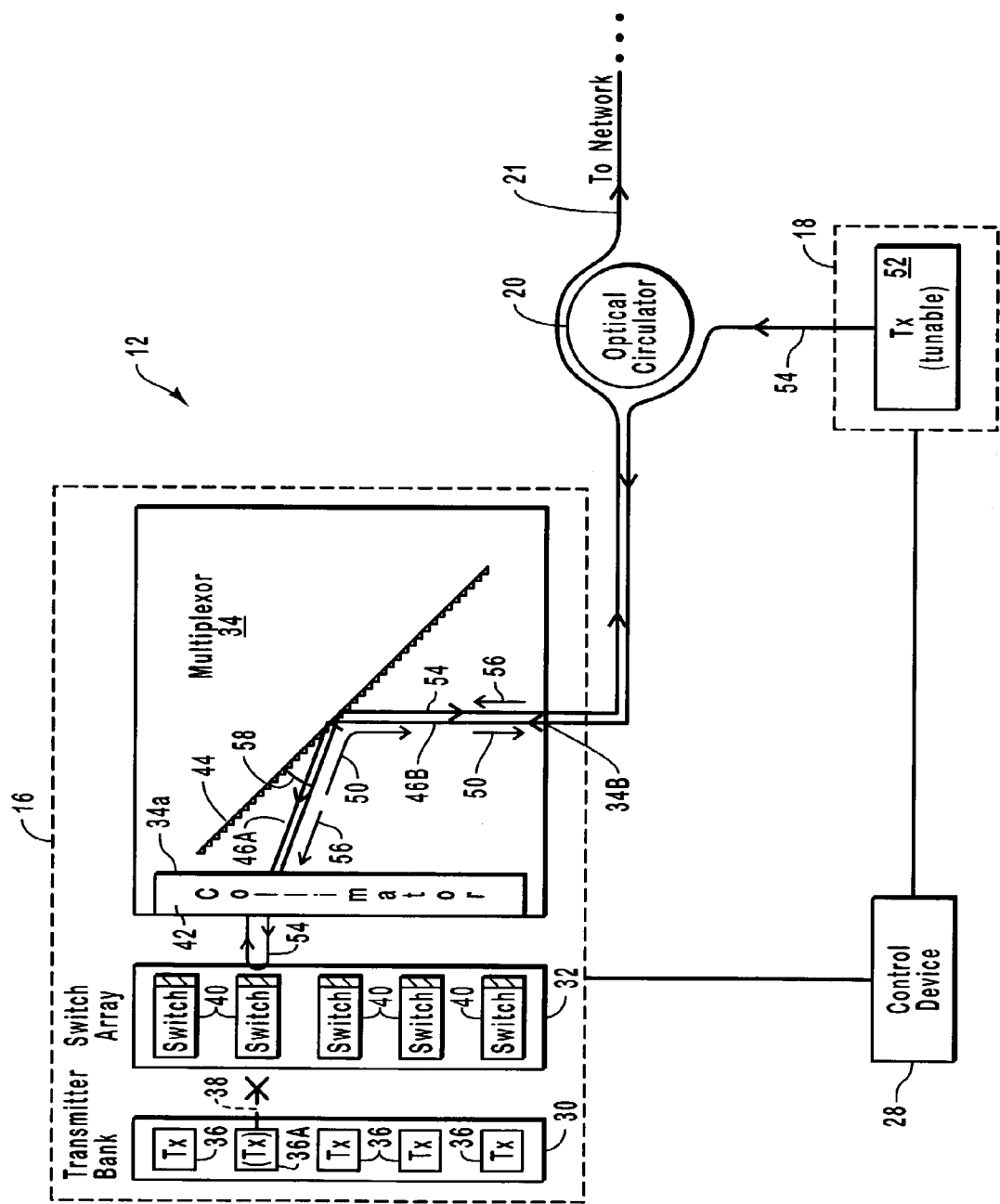
FIG. 3 is a block diagram showing the transmission node of FIG. 1 during backup operation.

Reference is now made to FIG. 3. It is an eventuality that an optical transmitter disposed in the transmitter bank 30 will malfunction and cease to operate. In FIG. 3, a malfunctioning transmitter is designated at 36A. As can be seen from FIG. 3, the malfunctioning optical transmitter 36A is unable to produce an optical signal channel 38 to be forwarded to the multiplexor 34. It is appreciated that any one of the optical transmitters 36 disposed in the transmitter bank 30 could malfunction at any time. When malfunction of the transmitter 36A occurs, a void is created in the data carried by the primary optical signal 48, which can result in significant data loss within the communications network 11.

The redundant optical signal transmission system 10 of the present embodiment is designed to prevent the loss of data transmission in the optical communications network 11 due to malfunction or failure of an optical transmitter, such as that designated at 36A. The backup functionality of the present system 10 is implemented via the backup transmission link 18 shown in FIG. 3. The backup transmission link 18 is configured to produce a backup channel to replace the primary channel that would be transmitted by the optical transmitter 36A had malfunction not occurred. The backup transmission link 18 and the primary transmission link 16 are further able to combine the backup channel with the primary optical signal 48, thereby creating a complete multiplexed optical signal for transmission to the optical communications network 11. It is noted that FIG. 3, for clarity, illustrates only the backup channel and not the primary optical signal 48.

In one presently preferred embodiment, the backup transmission link 18 generally comprises a tunable backup optical transmitter 52. The tunable backup transmitter 52 is capable of producing an optical signal channel having one of a wide range of optical wavelengths. Specifically, the backup transmitter 52 is configured to produce an optical signal channel having a wavelength that corresponds to any of the wavelengths of the channels 38 produced by the optical transmitters 36 disposed in the transmitter bank 30. As illustrated, then, the tunable backup transmitter 52 in the present embodiment is configured to receive an electrical signal originally destined for the malfunctioning transmitter 36A and modulate it to produce a backup optical signal channel 54 that corresponds in wavelength to the channel formerly produced by the malfunctioning transmitter. In this way, the backup transmitter 52 can replace the functionality of any malfunctioning optical transmitter in the transmitter bank 30, as described in more detail below. In one embodiment, the backup optical transmitter 52 can alternatively comprise an optical transceiver. Again, the malfunctioning optical transmitter 36A is merely representative of any one of the optical transmitters 24 that is malfunctioning, and is not intended to comprise only one particular transmitter. Upon learning of the disclosure made herein, those of skill in the art will be able to identify and select tunable optical transmitters that can be used as a tunable backup optical transmitter 30 according to the invention.

In operation, presently preferred embodiments of the backup transmission link 18 enable the transmission node 12 to provide a complete multiplexed optical signal for use in the optical communications network 11 notwithstanding the malfunction of an optical transmitter. During normal operation the primary transmission link 16 provides a complete primary optical signal 48 comprising each of the plurality of channels 38 produced by the optical transmitters 36. In the event that a malfunctioning optical transmitter 36A is detected, the backup transmission link 18 is activated. At this point, the tunable backup transmitter 52 is activated and immediately tuned to the optical wavelength formerly used by the malfunctioning optical transmitter 36A to modulate electrical signals from a connected device (not shown). The transmission control device 28 immediately transfers the electrical signal input from the malfunctioning optical transmitter 36A to the now-tuned backup transmitter 52, which at once begins modulating the electrical signals into optical signals. This creates the backup channel 54 having the wavelength corresponding to the failed transmitter 36A. At this point, the malfunctioning optical transmitter 36A is operably isolated from the transmission node 12, with the backup transmitter 52 now producing the backup channel 54 that replaces the channel produced by the primary transmitter 36A before malfunction occurred.

Once produced, the backup channel 54 is directed to the optical circulator 20, which redirects the channel to the multiplexor port 34B. Traveling in a second direction, indicated by arrows 56, the backup channel 54 enters the multiplexor 34 and is directed to the diffraction grating 44. It is noted that the second direction 56 in which the backup channel 54 travels is opposite that traveled in the first direction by the primary optical signal 48, indicated by the arrows 50 in FIG. 2.

The backup channel 54 is directed to the grating 44 using the same path, but in the opposite direction, as that traveled by the primary optical signal 48 formed at the grating. The backup channel 54 then impinges on the diffraction grating 44. This impingement with the grating 44 causes the backup channel 54 to diffract off the grating at an angle of diffraction 58 that is a function of its wavelength. Because the backup channel 54 has the same wavelength as the channel formerly produced by the malfunctioning primary transmitter 36A, the backup channel is diffracted off the grating 44 at an angle of diffraction 58 that is equal to the angle of incidence 47 of the specified channel 38 before transmitter malfunction. Thus, after diffraction, the backup channel 54, still traveling in the second direction, is directed, given its angle of diffraction, to the switch 40 corresponding to the failed transmitter 36A.

As explained above, upon malfunction of the transmitter 36A, the control device 28 immediately changes the switch 40 corresponding to the failed transmitter from the open state to the reflective state. The backup channel 54, after diffracting off the grating 44, engages with the optical switch 40 corresponding to the failed transmitter 36A. The backup channel 54, upon interacting with the switch 40 in its reflected state, is reflected by the switch back toward the diffraction grating 44 along a path identical to the first path 46A of the specified channel of the transmitter 36A before malfunction. As a result of this reflection by the switch 40, the reflected backup channel 54 is now traveling in the first direction when it interacts again with the diffraction grating 44 at an angle of incidence identical to that of the specified channel 38 of the transmitter 36A before malfunction. The grating 44 then diffracts the reflected backup channel 54 to a path identical to the second path 46B.

Simultaneous to the reflection of the backup channel 54 described above, the other channels 38 of the remaining transmitters 36 are produced and directed toward the diffraction grating 44 along their respective paths 46A. The diffraction of the channels 36 occurs at the same time as the diffraction of the reflected backup channel 54 such that, as a result of the diffraction, the backup and primary channels are combined, resulting in a complete, multiplexed primary optical signal 48 that directed along the second path 46B. Some synchronization of the backup channel 54 with the channels 36 may be necessary or desired to optimize the complete primary optical signal 48. The control device 28 (or other suitable device) can perform the synchronization. As already described, this primary optical signal 48 can then be directed to the optical circulator 20 for redirection to the optical network 11. This redundant process can continue without interruption until operation of the transmission node 12 is terminated, or until the malfunctioning optical transmitter 36A begins functioning once again. In this way, a complete multiplexed signal can be produced by the transmission node of the present invention despite the malfunction of one of its optical transmitters.

Figure 4:
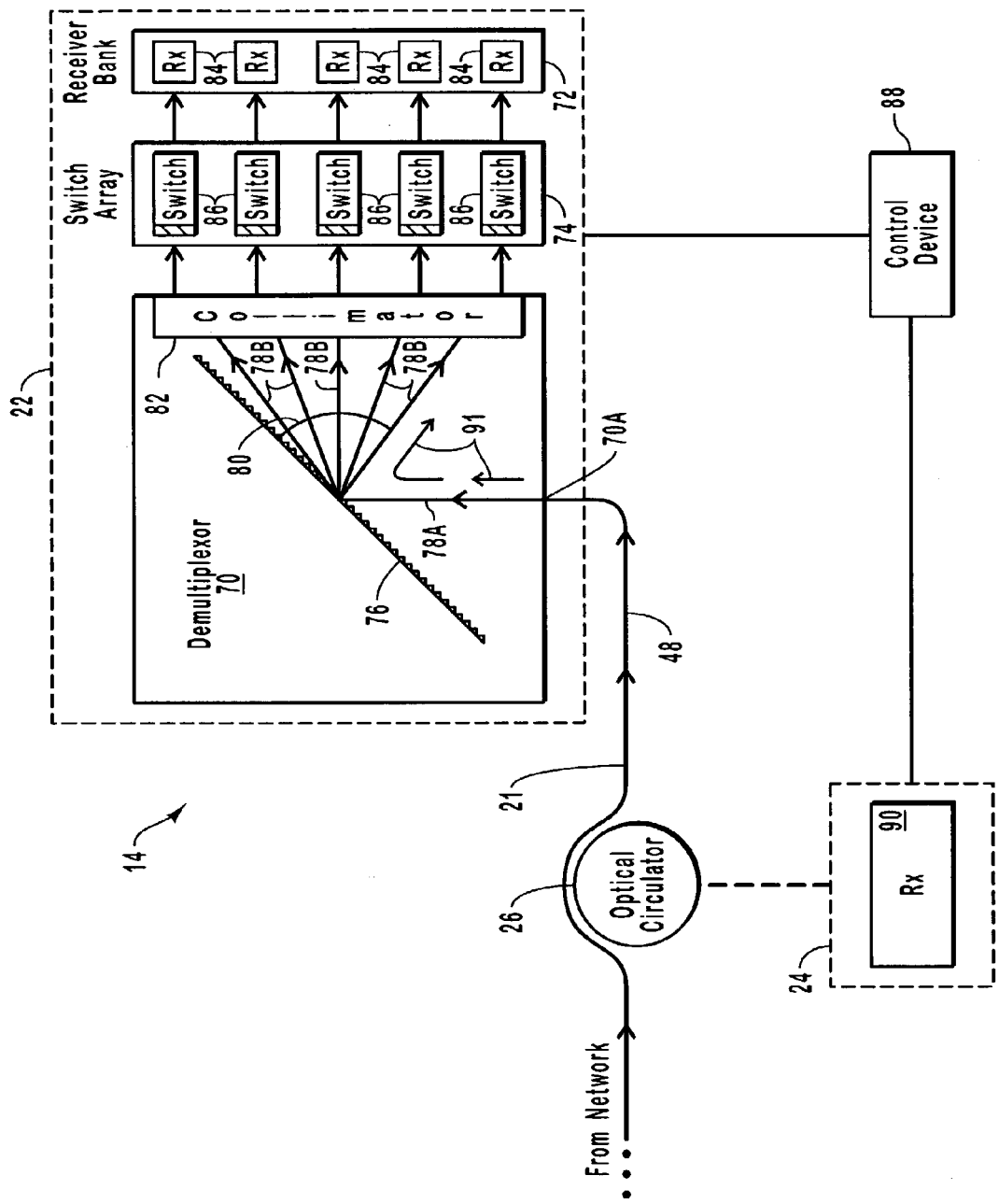
FIG. 4 is a block diagram showing the reception node of FIG. 1 during normal operation.

Reference is now made to FIG. 4, which depicts one presently preferred embodiment of the reception node 14 of the present redundant optical signal system 10. As before, the reception node 14 illustrated and described herein can exist in an optical network as an autonomous system, or can be integrated as part of a larger redundant system, as shown in FIG. 1. As will be described, the reception node 14 of the present invention enables multiplexed optical signals to be completely received and modulated despite the malfunction of an optical receiver.

The reception node 14 of FIG. 4 generally comprises a primary reception link 22 and a backup reception link 24 for the redundant reception of multiplexed optical signals. Both the primary reception link 22 and the backup reception link 24 are interconnected to the optical communications network 11 via an optical circulator 26 similar to circulator 20 in FIGS. 2 and 3.

The primary reception link 22 comprises a demultiplexor 70, a receiver bank 72, and a switch array 74. The demultiplexor 70 is configured to receive an optical signal, such as the complete, multiplexed primary optical signal 48 produced by the transmission node 12 described above. The primary optical signal 48 is received from the optical communications network 11 via the communications medium 21, in this case, a fiber optic cable. As before, the primary optical signal 48 comprises multiple channels 38 of optical signals, each channel having a distinct optical wavelength. The primary optical signal 48 is produced using wavelength division multiplexing techniques, as described earlier. As is well known, the demultiplexor 70 is operable to divide the primary optical signal 48 into its constituent wavelength-distinct channels 38. This channel division is performed by a diffraction grating 76, or similar device. Similar to the channel combining operation performed by the multiplexor 34 of FIGS. 2 and 3, the primary optical signal 48 is directed from the optical circulator 26 into the demultiplexor 70 via a port 70A, and is further directed along a first path 78A toward the diffraction grating 76 in a first direction indicated by arrows 91. Upon interacting with the diffraction grating 76, the primary optical signal 48 is diffracted into its constituent wavelength-distinct channels 38, each of which departs from the grating in a diverging path 78B. Each path 78B defines an angle of diffraction, such as the angle shown at 80, with the surface of the grating 76 that is determined according to the wavelength of the channel 38. The separated channels 38 can then be collimated, such as via a collimator 82, and forwarded to a plurality of optical receivers 84 disposed in the receiver bank 72 via the switch array 74.

The switch array 74 comprises a plurality of optical switches 86, equal in number to the optical receivers 84 disposed in the receiver bank 72, such that each switch is matched to a corresponding receiver 84. Each optical switch 86 acts as a gate by which optical signals comprising the respective channel 38 can, according to the state of the switch, either be transmitted through the switch to its corresponding receiver 84, or reflected by the switch for use by the backup reception link 24 when needed, as explained further below. Consistent with these purposes, each switch 86 is switchable between an open state, wherein the channel 38 can pass therethrough, and a reflective state, wherein the channel is reflected back toward the diffraction grating 76. A control device 88 can be utilized to control the state of the switches 86, as well as other control functions of the reception node 14, such as activation of the backup reception link 24, etc. In one embodiment, the collimating function performed by the collimator 80 can be integrated into each switch 86, in addition to focusing and other operations that can be performed on each channel 38.

One example of the optical switch 86 can be found in U.S. Provisional Patent Application Ser. No. 60/418,445, filed Oct. 15, 2002, which has been incorporated herein by reference. The optical switch 86 as taught by the above-referenced application is configured in a similar fashion to the optical switch 40 discussed above. Thus in its open state, each optical switch 86 receives a corresponding channel 38 into the first waveguide and transmits that channel such that it exits the switch and proceeds as described below. When the switch 86 is in its reflective state, however, the channel 38 received by the first waveguide is diverted by the electrode heater at the intersection region to the second waveguide, where the channel is reflected back in an opposite direction by the reflective component disposed at the terminal end of the second waveguide. The reflected channel then exits the optical switch 86 via the first waveguide for direction to the backup reception link 24, as described further below.

Under normal operation, each of the optical signal channels 38, after demultiplexing, is sent to the receiver bank 60. Each primary optical receiver 84 disposed in the receiver bank 60 is configured to receive from its corresponding switch 86 one channel 38 of the demultiplexed primary optical signal 48. Each primary receiver 84 modulates its respective channel 38 back into an electrical signal and forwards it to a connected device (not shown) for use thereby. Each primary receiver 84 can comprise a dedicated receiver, or in one embodiment, can comprise an optical transceiver, having both optical transmitting and receiving functions.

Figure 5:
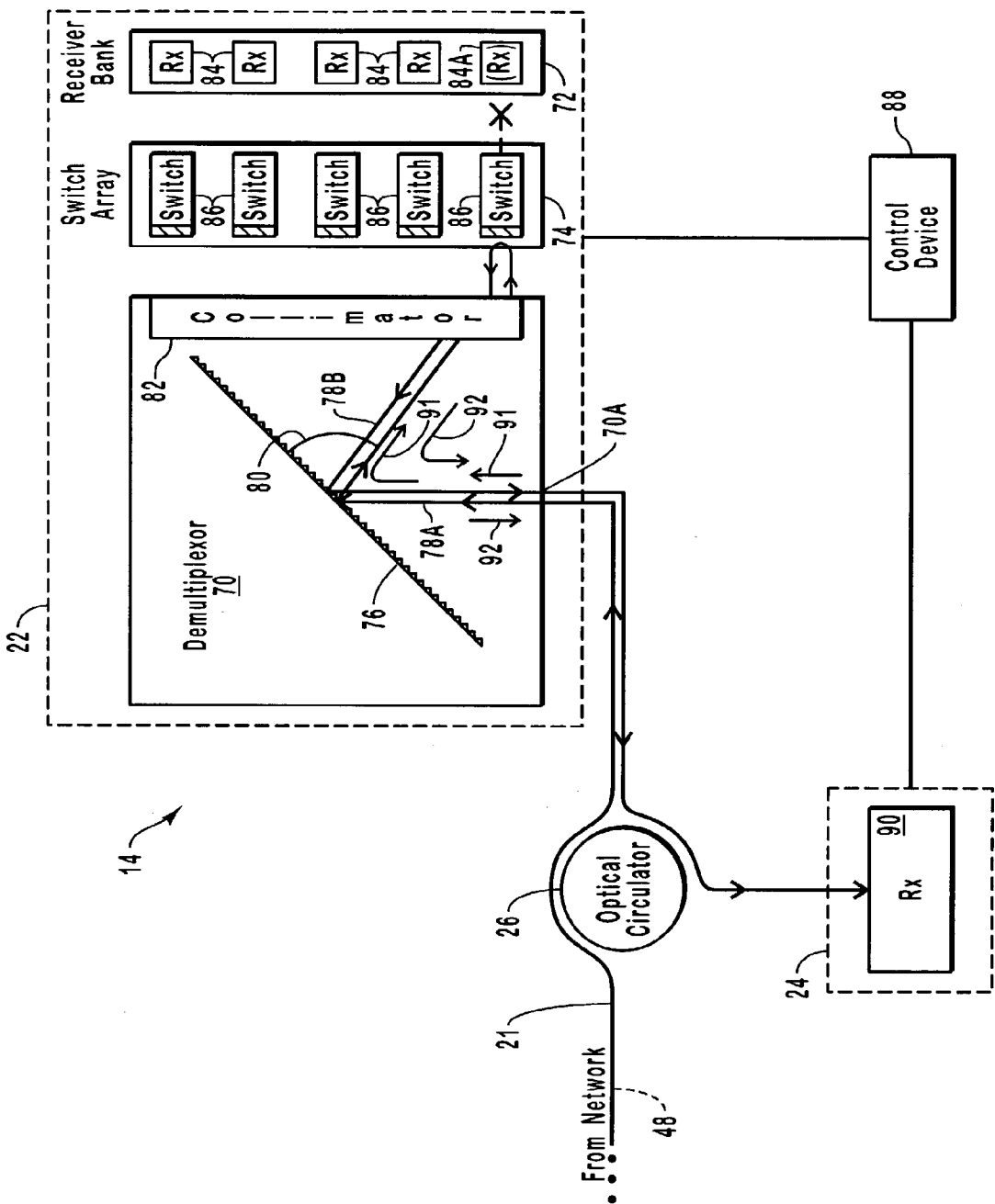
FIG. 5 is a block diagram showing the reception node of FIG. 1 during backup operation.

Reference is now made to FIG. 5. As illustrated, the receiver bank 72 can also include a malfunctioning optical receiver, generally designated at 84A. Because of its malfunction, the receiver 84A, which can represent any one of the receivers disposed in the receiver bank 72, is unable to receive and modulate its respective channel 38. As already discussed, this can cause a void in the data transmitted via the optical communications network 11. Again, it is appreciated that the malfunctioning optical receiver 84A is merely representative of any one of the optical receivers 84 that is malfunctioning, and is not intended to comprise any particular receiver.

The backup reception link 24 provides backup reception capabilities to compensate for the loss of information that would otherwise occur with the malfunctioning optical receiver 84A. In the illustrated embodiment, the backup reception link 24 comprises a backup optical receiver 90, which is configured to receive the channel 38 formerly received by the specified receiver 84 before malfunction. As will be seen, the backup optical receiver 90 is able to receive the specified channel 38 and to modulate it into an electrical signal, thereby providing backup signal reception for the malfunctioning receiver. In one embodiment, the backup receiver 90 can alternatively comprise an optical transceiver.

The backup reception link 24 described above cooperates with the primary reception link 22 to provide backup reception function of any one of the optical receivers 84 in the event of receiver failure. In operation, a primary optical signal 48 is received from the optical communications network 11 and is directed to the port 70A of the demultiplexor 70 via the optical circulator 26. Under normal operation, the primary optical signal 48 is separated and processed by the optical receivers 84 as described above.

In the event of malfunction or failure of one of the optical receivers, such as the receiver 84A, the backup reception link 24 is activated. While normal operation for the demultiplexor 70, the receiver bank 72, and the switch array 74 is continued with respect to the functional receivers 84, the control device 88 immediately switches the switch 86 corresponding to the failed receiver 84A to the reflective state in preparation for redirecting the channel 38 originally destined for that receiver to the backup reception link 24.

FIG. 5, which, for clarity, illustrates only the channel 38 that is affected by the receiver failure, shows the specified channel entering the demultiplexor 70 at port 70A as part of the primary optical signal 48, and traveling along the first path 78A in the first direction, marked by arrows 91, before diffracting off the diffraction grating 76 at the specific angle of diffraction 80. The diffracted channel 38, now travels along the second path 78B specific to the channel's wavelength and is collimated by the collimator 82 before impinging upon the switch 86 corresponding to the failed receiver 84A.

The switch 86 corresponding to the failed receiver 84A, already having been switched to the reflective state by the control device 88, reflects the specified channel 38 back through the collimator 82 and on to the diffraction grating along the second path 78B in a second direction indicated by arrows 92. The second direction 92 traveled by the reflected specified channel 38 is opposite the first direction 91 traveled by the channel as part of the primary optical signal 48 upon first entry into the demultiplexor 70. Because the reflected channel 38 impinges upon the diffraction grating 76 at the same angle as the angle of diffraction 80, the reflected channel 38 is diffracted on to the first path 78A traveling in the second direction 92.

The channel 38, after diffracting off the grating 76 along the first path 78A, exits the demultiplexor 70 at port 70A and is redirected by the optical circulator 26 to the backup reception link 24, and specifically to the backup optical receiver 90. Note that the optical circulator 26 serves as one means for redirecting the channel 38 from the demultiplexor 70 to the backup optical receiver 90. Other means are also contemplated for performing this function. The backup reception link 24, activated by the control device 88, receives the incoming channel 38 from the optical circulator 26 and modulates it into electrical signals for use by a connected device (not shown). Simultaneous to this process, the rest of the primary optical signal is received and processed by the functional optical receivers disposed in the receiver bank 72. This redundant process can continue without interruption until operation of the reception node 14 is terminated, or until the malfunctioning optical receiver 84A begins functioning once again. In this way, full reception and modulation of the primary optical signal received from the optical network is achieved despite the failure of an optical receiver, thereby ensuring full data transmission via the network.

It is appreciated that the backup links described herein can comprise more than one backup optical transmitter or receiver for enabling backup optical signal transmission and reception. For instance, the backup transmission link in one embodiment could comprise two backup transmitters. This configuration is useful in the event of failure of more than one primary optical transmitter in the primary transmission link. Similarly, the backup reception link described herein could also comprise a plurality of backup optical receivers to provide redundant reception capability in the event of failure of more than one primary optical receiver.

In other embodiments of the present invention, more than one transmission or reception node can be disposed in the optical network. For instance, two or more transmission nodes can be included in the network to provide redundant transmission capabilities at multiple locations in the network. Additionally, it is appreciated that the various components comprising the transmission and reception nodes of the present invention, such as the transmitter bank, receiver bank, switch arrays, multiplexor, and demultiplexor can be configured with small dimensions so as to be disposed on a single integrated circuit chip.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A redundant optical signal transmission system for use with an optical communications network, the system comprising:
   a plurality of primary optical transmitters, each being operable to produce a channel having a distinct wavelength;
   an optical signal multiplexor including a diffraction grating operable to combine the channels produced by the plurality of primary optical transmitters into a multiplexed optical signal; and
   a switch array operably disposed between the multiplexor and the plurality of transmitters, the switch array comprising a plurality of optical switches, each switch being operably connected to a corresponding primary optical transmitter, wherein, in the event of malfunction of one of the plurality of primary optical transmitters, the corresponding optical switch is in a reflective state in which a backup channel having a wavelength of the channel associated with the malfunctioning primary optical transmitter diffracts off the diffraction grating onto said corresponding optical switch and is thereafter reflected off the switch to the diffraction grating so as to be multiplexed with the multiplexed optical signal.

2. A redundant optical transmission system as defined in claim 1, wherein each switch is switchable between an open state, wherein the optical signal channel produced by the corresponding primary optical transmitter passes through the switch, and said reflective state, wherein the switch is operable to reflect an incoming optical signal incident on the switch, the switch being changed from the open state to the reflective state when said one of the plurality of primary optical transmitters malfunctions.

3. A redundant optical transmission system as defined in claim 1, further comprising a backup optical signal transmission link that is activated when said one of the primary optical transmitters malfunctions, the backup optical signal transmission link comprising a tunable backup optical transmitter operable to generate said backup channel.

4. A redundant optical transmission system as defined in claim 3, wherein the tunable backup optical transmitter is operable to generate said backup channel such that said backup channel is directed to the diffraction grating, and such that the backup channel is thereafter diffracted off the diffraction grating onto said corresponding optical switch.

5. A redundant optical signal transmission system as defined in claim 3, further comprising means for redirecting the backup channel from the backup optical signal transmission link to the multiplexor.

6. A redundant optical signal transmission system as defined in claim 5, wherein the means for redirecting comprises an optical circulator in operable communication with the multiplexor, the backup optical signal transmission link, and the optical communications network.

7. A redundant optical signal transmission system as defined in claim 1, wherein the multiplexed optical signal travels within the multiplexor in a first direction, and wherein the backup channel is diffracted off the diffraction grating to said corresponding optical switch in a second direction that is opposite the first direction.

8. A redundant optical signal transmission system as defined in claim 7, wherein the backup channel traveling in the second direction is diffracted by the diffraction grating at an angle of diffraction equal to the angle of diffraction of the channel associated with the malfunctioning primary optical transmitter.

9. A redundant optical signal transmission system as defined in claim 1, wherein the backup channel has the same wavelength as the channel associated with the malfunctioning primary optical transmitter.

10. A redundant optical signal transmission system as defined in claim 1, further comprising a collimator to direct the channels produced by the plurality of primary optical transmitters toward the diffraction grating at distinct angles of incidence.

11. A redundant optical signal transmission system as defined in claim 10, wherein the collimator comprises a portion of each switch of the switch array.

12. A redundant optical signal transmission system as defined in claim 1, further comprising a control device operable to control the state of each of the switches in the switch array.

13. A redundant optical signal transmission system as defined in claim 1, wherein the system is incorporated as a transmission node in the optical communications network.

14. A redundant optical signal transmission system as defined in claim 1, wherein each optical switch of the switch array comprises:
   a substrate;
   a first waveguide disposed on the substrate, the first waveguide suitable for carrying an optical signal;
   a second waveguide disposed on the substrate, the second waveguide suitable for carrying an optical signal, the second waveguide intersecting the first waveguide at an angle so as to define an intersection region;
   an electrode heater disposed adjacent to the intersection region, wherein heating of the electrode heater enables an optical signal to be diverted in the intersection region from one of said waveguides to the other waveguide; and
   a high reflective coating disposed at a terminal end of the second waveguide, the high reflective coating operable to reflect in the opposite direction an optical signal passing through the second waveguide.

15. A redundant optical signal reception system for use with an optical communications network, the system comprising:
   an optical signal demultiplexor including a diffraction grating operable to divide an incoming multiplexed optical signal into discrete channels, each channel having a distinct wavelength and a distinct angle of diffraction off the diffraction grating;
   a plurality of primary optical receivers, each being operable to receive one of the discrete channels; and
   a switch array operably disposed between the demultiplexor and the plurality of primary optical receivers, the switch array comprising a plurality of optical switches, each switch being operably connected to a corresponding primary optical receiver, wherein, in the event of malfunction of one of the plurality of primary optical receivers, the corresponding optical switch is in a reflective state in which the channel associated with the malfunctioning primary optical receiver reflects off the corresponding optical switch onto the diffractive grating and diffracts off the diffractive grating so as to be redirected to a backup optical receiver.

16. A redundant optical signal reception system as defined in claim 15, wherein each switch is switchable between an open state in which the corresponding channel passes through the switch from the demultiplexor to the corresponding receiver, and said reflective state in which the switch is operable to reflect the corresponding optical signal channel received from the demultiplexor, the switch being changed from the open state to the reflective state when the corresponding primary optical receiver malfunctions.

17. A redundant optical signal reception system as defined in claim 15, further comprising a backup optical signal reception link that is activated when said one of the primary optical receivers malfunctions.

18. A redundant optical signal reception system as defined in claim 17, further comprising means for redirecting the channel corresponding to the malfunctioning primary optical receiver from the demultiplexor to the backup optical receiver.

19. A redundant optical signal reception system as defined in claim 18, wherein the means for redirecting comprises an optical circulator in operable communication with the demultiplexor, the backup optical signal transmission link, and the optical communications network.

20. A redundant optical signal reception system as defined in claim 17, wherein the backup optical signal reception link comprises said backup optical receiver, wherein the backup optical receiver is operable to receive the channel corresponding to the malfunctioning primary optical receiver.

21. A redundant optical signal reception system as defined in claim 15, wherein the channel corresponding to the malfunctioning primary optical receiver diffracts off the diffraction grating onto the corresponding switch at a first direction and reflects off the corresponding switch and onto the diffraction grating at a second direction that is opposite said first direction.

22. A redundant optical signal reception system as defined in claim 15, further comprising a collimator to direct the channels toward the corresponding primary optical receivers.

23. A redundant optical signal reception system as defined in claim 22, wherein the collimator comprises a portion of each switch disposed in the switch array.

24. A redundant optical signal reception system as defined in claim 22, wherein the collimator comprises a portion of the demultiplexor.

25. A redundant optical signal reception system as defined in claim 15, further comprising a control device operable to control the state of each of the switches in the switch array.

26. A redundant optical signal reception system as defined in claim 15, wherein the system is incorporated as a reception node in the optical communications network.

27. A redundant optical signal transmission system as defined in claim 15, wherein each optical switch of the switch array comprises:
a substrate;
a first waveguide disposed on the substrate, the first waveguide suitable for carrying an optical signal;
a second waveguide disposed on the substrate, the second waveguide suitable for carrying an optical signal, the second waveguide intersecting the first waveguide at an angle so as to define an intersection region;
an electrode heater disposed adjacent to the intersection region, wherein heating of the electrode heater enables an optical signal to be diverted in the intersection region from one of said waveguides to the other waveguide; and
a high reflective coating disposed at a terminal end of the second waveguide, the high reflective coating operable to reflect in the opposite direction an optical signal passing through the second waveguide.

28. In an optical communications network, a method of replacing a missing optical signal channel in an outgoing multiplexed optical signal, the outgoing multiplexed optical signal comprising a plurality of channels, each channel having a distinct wavelength, the optical communications network comprising a multiplexor, the multiplexor including a diffraction grating that combines the optical signal channels into the outgoing multiplexed optical signal, the method comprising the acts of:
determining the wavelength of the missing channel;
producing a backup channel having the same wavelength as the missing channel;
directing the backup channel to the multiplexor;
diffracting the backup channel from the diffraction grating in a direction that is opposite the direction of the outgoing multiplexed optical signal; and
reflecting the diffracted backup channel back to the diffraction grating such that the backup channel combines with the outgoing multiplexed optical signal.

29. A method as defined in claim 28, further comprising the act of collimating each of the optical signal channels before being combined by the diffraction grating, such that each channel is incident upon the diffraction grating along a path that forms an angle of incidence with a surface of the grating.

30. A method as defined in claim 28, wherein the act of diffracting the backup channel is performed such that the backup channel travels away from the diffraction grating after diffraction along a path forming an angle of diffraction that is substantially identical to the angle of incidence of the missing channel.

31. A method as defined in claim 28, further comprising the act of synchronizing the backup channel with the outgoing multiplexed optical signal.

32. A method as defined in claim 28, wherein each channel is produced by one of a plurality of optical transmitters, and wherein the act of reflecting is performed by an optical switch that corresponds to a malfunctioning optical transmitter that is responsible for producing the missing channel, the optical switch comprising a plurality of intersecting waveguides, at least one of the waveguides including a reflective coating operable to reflect the diffracted backup channel.

33. A method as defined in claim 28, wherein the act of directing is performed using an optical circulator.

34. In an optical communications network, a method of receiving and modulating a specified optical signal channel from an incoming multiplexed optical signal comprising a plurality of optical signal channels, each channel having a distinct wavelength, the method comprising the acts of:
separating the incoming multiplexed optical signal containing the specified channel into the plurality of channels using a diffraction grating of a demultiplexor, the specified channel being diffracted in a first direction;
after separating the multiplexed incoming optical signal, reflecting the specified channel back to the diffraction grating in a second direction opposite the first direction;
diffracting the reflected specified channel from the diffraction grating; and
receiving and modulating the reflected specified channel in a backup optical receiver.

35. A method as defined in claim 34, wherein the act of separating is performed such that each channel diffracted off the diffraction grating has a unique angle of diffraction.

36. A method as defined in claim 35, wherein the act of reflecting is performed such that the specified channel is incident on a surface of the diffraction grating at an angle of incidence that is substantially identical to the angle of diffraction of the specified channel.

37. A method as defined in claim 34, further comprising the act of directing each remaining optical signal channel through a corresponding optical switch to a corresponding optical receiver.

38. A method as defined in claim 34, wherein the act of reflecting is performed by an optical switch, the optical switch comprising a plurality of intersecting waveguides, at least one of the waveguides including a reflective coating operable to reflect the specified channel.

39. A method as defined in claim 34, further comprising, after the act of diffracting, the act of directing the reflected specified channel to the backup optical receiver.

40. A method as defined in claim 39, wherein the act of directing is performed using an optical circulator.

* * * * *